United States Patent [19]

Page et al.

[11] Patent Number: 5,661,458

[45] Date of Patent: *Aug. 26, 1997

[54] ELECTRONIC HOUSE ARREST MONITORING SYSTEM WITH AUTOMATIC FEE COLLECTION FEATURE

[75] Inventors: David M. Page, Niwot; Elvin L. Riggs, Boulder; Joseph P. Newell, Louisville, all of Colo.

[73] Assignee: BI Incorporated, Boulder, Colo.

[*] Notice: The term of this patent shall not extend beyond the expiration date of Pat. No. 5,369,699.

[21] Appl. No.: 108,990

[22] Filed: Aug. 18, 1993

[51] Int. Cl.$^6$ .................................................. G08B 23/00
[52] U.S. Cl. ............................ 340/573; 379/38; 379/114
[58] Field of Search ........................... 340/573, 825.35, 340/870.02; 364/464.04; 379/38, 40, 51, 114, 121, 143, 145, 154

[56] References Cited

U.S. PATENT DOCUMENTS

| | | | |
|---|---|---|---|
| 4,747,120 | 5/1988 | Foley | 379/38 |
| 4,843,377 | 6/1989 | Fuller | 340/573 |
| 4,885,571 | 12/1989 | Pauley et al. | 340/573 |
| 4,918,432 | 4/1990 | Pauley et al. | 340/573 |
| 4,935,956 | 6/1990 | Hellwarth et al. | 379/145 X |
| 4,952,928 | 8/1990 | Carroll et al. | 340/825.54 |
| 4,980,671 | 12/1990 | McCurdy | 340/568 |
| 4,999,613 | 3/1991 | Williamson et al. | 340/573 |
| 5,204,670 | 4/1993 | Stinton | 340/825.54 |
| 5,369,699 | 11/1994 | Page et al. | 379/38 |

*Primary Examiner*—Thomas Mullen
*Attorney, Agent, or Firm*—James R. Young; Robert G. Crouch; Chrisman Bynum & Johnson

[57] ABSTRACT

An EHAM system consists of a central monitoring system (CMS), a field monitoring device (FMD), an electronic detection circuit that generates a detection signal upon the occurrence of a predetermined event, e.g., the absence of the monitored individual from a monitoring location, and a communications network. The communications network consists of at least one communications link wherein a fee-based communications mode may be used. The CMS is installed at a central monitoring location, the FMD is installed at the monitoring location, and the electronic detection circuit is attached or otherwise coupled to the individual to be monitored at the monitoring location. The occurrence or non-occurrence of the predetermined event is detected during a prescribed reporting time period. Regular or random communications are established between the FMD and CMS during the reporting time period to inform the CMS about the occurrence or non-occurrence of the predetermined event. One communication between the FMD and CMS during a given reporting time period is made by accessing the communications link using the fee-based communications mode. All other communications between the FMD and CMS during the reporting time period are made by accessing the communications link using a non-fee-based communication mode. Hence, a predetermined fee is automatically assessed to the monitored individual only once each reporting time period.

26 Claims, 4 Drawing Sheets

ELECTRONIC HOUSE ARREST MONITORING SYSTEM WITH AUTOMATIC FEE COLLECTION FEATURE

BACKGROUND OF THE INVENTION

The present invention relates to electronic house arrest monitoring (EHAM) systems, and more particularly to an EHAM system that provides automatic fee collection from its users.

EHAM systems are known in the art. See, e.g., U.S. Pat. No. 4,885,571; 4,918,432 and 4,952,913, issued to Pauley et al., all of which are incorporated herein by reference. As indicated in those references, house arrest (a court-ordered mandate that requires an individual to remain at a specific monitoring location, e.g., his or her house, at specified times) represents a very significant and viable alternative to conventional incarceration and other court ordered restrictions, especially those imposed on individuals who have been found guilty of non-violent crimes.

Such systems fulfill a valuable need in that they allow a relatively large number of individuals who have been ordered by a court to remain under house arrest, or who are under parole or probation requirements to remain at certain locations (monitoring locations) at specified times, to be electronically monitored for compliance with whatever restrictions have been imposed. Such electronic monitoring can advantageously be carried out at a fraction of the cost of incarceration of the monitored individuals; and also at a much reduced cost over conventional probation/parole monitoring procedures. Further, an electronic monitoring system offers the advantage of reducing the physical contact between a monitoring officer, e.g., a probation or parole officer, and the monitored individual, which physical contact can at certain times and certain locations pose a potential danger to the officer.

A typical EHAM system includes an electronic detection circuit, e.g., a transmitter tag that is securely attached, e.g., to a limb of an individual to be monitored, and a field monitoring device (FMD) that is mounted within the location where the individual is to remain (the monitoring location, or remote location). The transmitter tag periodically transmits a proximity signal that uniquely identifies its wearer. If the offender is within range of the FMD, i.e., at the designated house arrest monitoring location, the FMD receives and logs the identifying signal. If the offender is not within range of the FMD, i.e., not at the monitoring location, the FMD notes the absence of the proximity signal. Periodically or as needed, telecommunicative contact is established between the FMD and a central monitoring system (CMS) at a central location so that the information received by the FMD can be uploaded (or transmitted) to the CMS. Such telecommunicative contact can be established by accessing a communications network with the FMD via a telecommunicative link (or communications link), e.g., a standard telephone line.

One type of EHAM system known in the art, referred to as an "active" monitoring system, generates and transmits radio wave signals as part of the monitoring process. Such an active EHAM system is described, e.g., in U.S. Pat. No. 4,918,432, issued to Pauley et al. In the Pauley et al. active EHAM system, each individual being monitored is fitted with an electronic bracelet or anklet. Such bracelet or anklet, referred to in the referenced patent as a "tag", includes a transmitter that periodically transmits an identifying radio wave signal (unique to each tag, and hence to each individual) over a short range (e.g., 150 feet). An FMD is installed at each location where the monitored individual is supposed to be. If the monitored individual is present at the FMD's monitoring location, a receiver circuit within the FMD receives the unique identifying signal. The FMD processing circuits can thus determine that a specific individual is present at the monitoring location when the signal is received. This information (which may be considered as "presence data") is stored within FMD memory circuits for subsequent downloading to a CMS. A computer, or central processing unit (CPU), which is part of the CMS, periodically or randomly polls the various monitoring locations through the telecommunicative link in order to prepare reports indicating the presence or absence of the individuals at the monitoring locations. Such reports are then used by the agency charged with the responsibility for monitoring the individuals (the monitoring agency) to ascertain whether or not such monitored individuals are in compliance with whatever restrictions have been imposed. Note that the monitoring agency may either be a government agency charged with monitoring individuals subject to house arrest, parole or probation, or may be a private agency under contract with the government agency to fulfill monitoring and supervision functions.

Because there is a significant expense associated with monitoring individuals under house arrest or those who have been sentenced to probation or parole, most jurisdictions in the United States have now authorized some form of correctional fees to be charged for the monitoring service. Specifically, statutes have been passed in over 28 states that authorize the collection of a fee for those on probation, and in over 15 states that authorize the collection of a fee for those on parole. The recent flurry of legislative activity, coupled with strapped state budgets, suggests that collecting fees from those on probation or parole will continue to be a popular mechanism for supplementing the corrections budget. Significantly, while not everyone favors collecting such fees, much of the opposition comes from those who believe too much time is spent on collection of fees rather than on supervising offenders. Hence, there is a significant need to reduce the time that monitoring agencies spend in collecting statutory fees from offenders, thereby freeing up such officers to fulfill the supervisory function for which they were hired.

The monthly supervision fees charged by monitoring agencies vary from $10 to $265, with the average monthly fee being between $20 and $26. The effective collection rate achieved by the agencies responsible for such collection is difficult to determine, but is probably less than about 50%. In many situations, monitoring agencies have been asked to perform the duties of a collection agent in order to attempt to collect fees that they are owed. Disadvantageously, this has the effect of further overburdening what are often overworked agencies, and results in diluted supervision efforts. Additionally, because of budgetary concerns, i.e., in situations where the monitoring agency must collect the fees in order to stay in business, trained corrections professionals are sometimes asked to be collection agents—a job for which they are not trained nor have interest. Hence, when the agencies are forced to make this request, they end up losing the time of trained corrections professionals in exchange for untrained and possibly unmotivated collection agents. There is thus a critical need in the corrections and supervision industry for a simple, yet effective, system or method for collecting a monitoring fees (referred to herein as the predetermined fee) that are owed by the individuals being monitored without requiring that monitoring agents or trained corrections professionals function as collection agents ("bill collectors").

SUMMARY OF THE INVENTION

The present invention provides an electronic house arrest monitoring (EHAM) system that includes automatic fee collection features for automatically charging a predetermined fee to an individual monitored by the EHAM system.

The EHAM system includes a central monitoring system (CMS), a field monitoring device (FMD), an electronic detection circuit, e.g., a transmitter, that generates an identification signal or detection signal upon the occurrence of a predetermined event, e.g., the absence of the monitored individual from a monitoring location, and a communications network. The communications network consists of at least one communications link wherein a fee-based communications mode can be effectuated.

In operation, the CMS is installed at a central location, the FMD is installed at a monitoring location, and the electronic detection circuit is typically attached to the individual to be monitored at the monitoring location. Next, the occurrence or non-occurrence of a predetermined event is detected during a first predetermined period of time. For example, each occurrence may be manifest by the presence of the detection signal and each non-occurrence may be manifest by the absence of the detection signal. After the first predetermined period of time, the communications network is accessed by the FMD through a communications link or channel using the fee-based communications mode. In response to being accessed by the FMD using the fee-based communications mode, the predetermined fee is automatically assessed to the individual to be monitored by the operator or provider of the communications network. Information indicative of whether the detection signal was generated during the first predetermined period of time is then transmitted from the FMD to the CMS via the communications link.

In one embodiment of the invention, the communications network has a non-fee-based communications mode in addition to the above-mentioned fee-based communications mode. In response to being accessed by the FMD using the non-fee-based communications mode, the predetermined fee is not automatically assessed to the individual to be monitored by the provider of the communications network. In such embodiment, the occurrence or non-occurrence of the predetermined event is again detected during a second predetermined period of time. Each occurrence is manifest by the presence of the detection signal and each non-occurrence is manifest by the absence of the detection signal. After the second predetermined period of time, the communications network is again accessed with the FMD through the communications link, but using the non-fee-based communications mode. Information indicative of whether the detection signal was generated during the second predetermined period of time is then transmitted from the FMD to the CMS via the at least one communications link.

One way of effectuating the fee-based communications mode is by accessing the communications network through a "1-900"-type communications link, e.g., telephone line. The non-fee-based communications mode is similarly effectuated by accessing the communications network through a local telephone line or a "1-800"-type telephone line. The predetermined fee is thus automatically assessed to the monitored individual each time the communications network is accessed using the "1-900"-type telephone number (which the FMD controls to be just once during a monitoring period, e.g., once a day) and the predetermined fee is not automatically assessed each time the communications network is accessed using the local or "1-800"-type telephone number (which the FMD controls to be used for all other contacts during the monitoring period).

Alternatively, the non-fee-based communications mode may be effectuated by accessing the communications network through use of a fee-selectable "1-900"-type telephone line. In this alternative, the provider of the "1-900"-type telephone line charges a first fee if a selection signal assumes a first condition, and a second fee (which in this instance may be zero) if the selection signal assumes a second condition. The selection signal is generated by the FMD, and thus the determination as to whether the fee-based communications mode or the non-fee-based communications mode is being effectuated is made by the FMD. The selection signal assumes a first condition when the fee-based communications mode has not already been effectuated during the current monitoring period, e.g., a twenty-four hour period beginning at approximately 12:00:01 a.m. and ending at approximately 12:00:00 a.m., and the selection signal assumes a second condition when the fee-based communications mode has already been effectuated during the current monitoring period. In response to the fee-based communications mode being effectuated, the predetermined fee is automatically assessed to the individual to be monitored by the provider of the communications network. On the other hand, in response to the non-fee-based communications being effectuated, the predetermined fee is not automatically assessed (or a fee of zero is assessed) to the individual to be monitored. Thus, the predetermined fee is automatically assessed to the monitored individual only one time during the current monitoring period so long as the communications network is accessed at least once during the current monitoring period.

It is thus a feature of the present invention to provide an EHAM system wherein a predetermined fee is automatically assessed to an individual to be monitored.

It is a further feature of the present invention to provide an EHAM system wherein a communications network used with the EHAM system is selectively accessed, e.g., only once during a prescribed monitoring period, using a fee-based communications mode such that the predetermined fee is automatically assessed to the monitored individual by a provider of the communications network each time the communications network is accessed using the fee based communications mode.

It is another feature of the present invention to provide an EHAM system wherein the provider of the communications network used with the EHAM system automatically assesses and collects the predetermined fee from the monitored individual, thereby eliminating the need for an agent responsible for a CMS to directly assess and/or collect the predetermined fee from the monitored individual.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
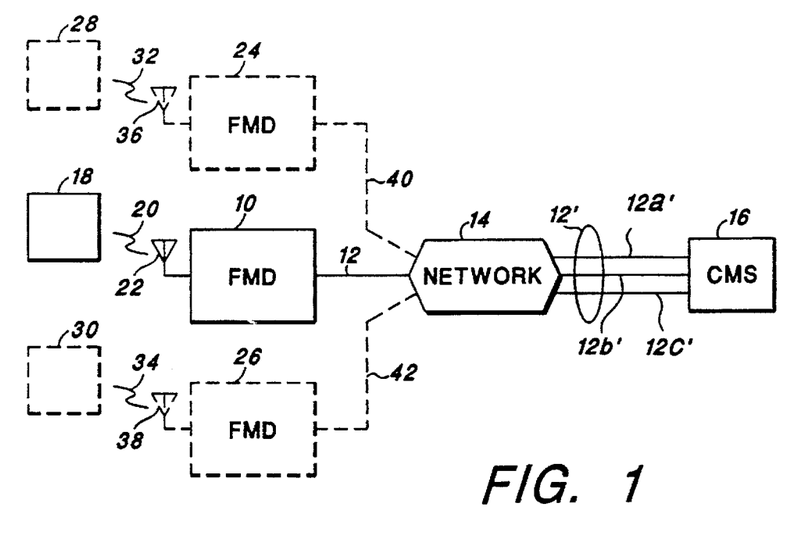
FIG. 1 is a block diagram of an EHAM system.

Referring first to FIG. 1, a block diagram is shown of an EHAM system made in accordance with the present invention. A field monitoring device (FMD) 10 is shown coupled via one or more partial communications links 12, 12' to a central monitoring system (CMS) 16.

For purposes of this description, the partial communications link 12 is referred to as an originating communications link 12, and the partial communications links 12' (which are a group of one or more individual partial communications links 12a', 12b', 12c') are referred to as destination communications links 12'. When the originating communications link 12 is accessed by the FMD 10, it is automatically coupled to one of the destination communications links 12a', 12b', 12c' by a switching means within the communications network 14 in response to a destination control signal communicated from the FMD 10 to the switching means. Thus, while the originating communications link 12 and the destination communications links 12' are referred herein to as separate partial communications links, they form, after being coupled by the switching means of the network 14, one of a group of possible communications links, e.g., consisting of links 12 and 12a', links 12 and 12b', or links 12 and 12c'. Note that while the FMD 10 will generally be referred to herein as being used to access the communications network 14, the CMS 16 may also be used to access the communications network 14 via one of the destination communications links 12a', 12b', or 12c', in which case the destination communications link 12a', 12b', or 12c' is automatically coupled to the originating communications link 12. Thus, the communications links, consisting of partial links 12 and 12a', 12 and 12b', or 12 and 12c' form part of the communications network 14 and are selectively coupled between the FMD 10 and the CMS 16 in response being accessed by the FMD 10 or the CMS 16.

Typically, the partial communications links 12, 12' are telephone lines, and the switching means is a telephone switching system such as those commonly maintained by telephone service operators, e.g., American Telephone and Telegraph (AT&T), Pacific Bell, Mountain Bell, General Telephone or the like. The destination control signal is typically an appropriate telephone number. Alternatively, the partial communications links 12, 12' may be cellular telephone links, radio frequency links, satellite links, digital networks, or any other means, or combination of means, for communicating data through the communications network 14 from the FMD 12 to the CMS 16, or vice versa.

The provider of the communications network 14 is typically responsible for maintaining the communications network 14. In order to defray the costs associated with such maintenance, the provider charges a usage fee for accessing the communications network 14. Every user or subscriber of the communications network 14 is assessed the charged fee. (Generally, for purpose of the present invention, the user or subscriber is a monitored individual referred to hereinbelow, or a person who is financially responsible for the monitored individual.) Various schemes are used in determining the amount of the usage fee to be charged for accessing the communications network 14. For example, a flat usage fee is typically charged for accessing the communications network 14 when a "local" or "1-800" destination communications link 12b' is coupled to the originating communications link 12. Such flat usage fees are known in the art and do not vary according to the length of time or frequency with which the communications network 14 is accessed.

In contrast, a time-based and/or distance-based usage fee may be charged for access to the communications network 14 when a "long distance" destination communications link (not shown) is coupled to the originating communications link 12. Such time-based and/or distance-based usage fees are also known in the art and vary in relation to the amount of time during which the communications links 12, 12' are accessed, or the distance between the network 14 and CMS 16.

Many providers of communications networks 14 provide fee assessment schemes for assessing a predetermined fee to the user or subscriber of the network (generally, the monitored individual) in addition to the usage fee. In one embodiment of the invention, the predetermined fee is assessed in response to the coupling of the originating communications link 12 to one of the destination communications links 12a', designated a fee-based communications link, e.g., a "1-900" telephone number. Another of the destination communications links 12' is designated as a non-fee-based the communications link 12b' and the coupling of the originating communications link 12 to the non-fee-based communications link does not result in the assessment of the predetermined fee. Thus, a fee-based communications mode is effectuated by accessing the communications network 14 using the fee-based communications link 12a' coupled to the originating communications link 12, and a non-fee-based communications mode is effectuated by accessing communications network using the non-fee-based communications link 12b' coupled the originating communications link 12.

The predetermined fee may be: (1) a flat fee, e.g., a monthly fee assessed during each month for which there is at least one access of the communications network using the fee-based communications mode; (2) based on the number of times the communications network is accessed using the fee-based communications mode during, e.g., one month; (3) based on the amount of time, e.g., in minutes, the communications network is accessed using the fee-based communications mode during, e.g., one month; or (4) based on any other fee charging scheme commonly known in the art. The predetermined fee is assessed to and collected from the user or subscriber of the communications network by the communication provider. Once collected, a prescribed portion of the fee is credited to a designated party, e.g., an agent responsible for maintaining the CMS 16, a government agency, or the like.

Also shown in FIG. 1 is an electronic detection circuit 18. The detection circuit 18 generates a detection signal upon the occurrence of a predetermined event, e.g., the removal (non-presence of) of the electronic detection circuit 18 from the proximity of the FMD 10. The electronic detection circuit 18 is typically attached to the individual to be monitored. (Note, as used herein, the terms "individual to be monitored" or "monitored individual" are to refer to a person, an animal, or an object.) A proximity signal is communicated from electronic detection circuit 18 to the FMD 10 via a suitable signal path. The signal path may include, in some embodiments, an internal antenna (not shown) in the electronic detection circuit 18, an RF link 20, and a receiver antenna 22. In other embodiments, the signal path may be a direct connection that is made when the detection circuit 18 is placed in contact with the FMD 10. In the event that the electronic detection circuit 18 is removed from the proximity of the FMD 10, the proximity signal will not be communicated to the FMD 10. The absence of the proximity signal comprises one type of detection signal, and signals to the FMD 10 that a particular predetermined event (e.g., the absence of the detection circuit) has occurred. Other types of predetermined events may also be used in lieu of or in addition to the removal of the electronic detection circuit 18 from the proximity of the FMD 10. For example, other predetermined events may include tampering with the electronic detection circuit 18, or the removal of the electronic detection circuit 18 from the monitored individual. The communicated detection signal is recorded by the FMD 10 in an internal memory.

Periodically, the FMD 10 accesses the communications network 14. Before such accessing, however, a determination is made in the FMD 10 as to whether the fee-based communications mode or the non-fee-based communications mode should be used. The determination is made in accordance with a control program as described in FIG. 3. In the event that the FMD 10 determines that the fee-based communications mode is to be used, and assuming that the link 12a' is the fee-based communications link, the FMD 10 accesses the communications network 14 through the originating communications link 12, and the fee-based destination communications link 12a' by activating the switching means with a destination control signal that instructs the switching means to couple the originating communications link 12 with the fee-based destination communications link 12a'. In contrast, in the event that the FMD 10 determines that the non-fee-based communications mode should be used, the FMD 10 accesses the communications network 14 through the originating communications link 12, and a non-fee-based destination communications link e.g., 12b', by activating the switching means with a destination control signal that instructs the switching means to couple the originating communications link 12 with the non-fee-based destination communications link 12b'.

In addition to the determination made by the FMD 10, the CMS 16 may optionally make a determination as to whether the fee based communications mode or the non-fee-based communication mode is to be effectuated. The determination made by the CMS 16 may operate so as to double check the determination made by the FMD 10, or alternatively, in lieu of the determination mode by the FMD 10. In operation, whenever the FMD 10 accesses the CMS 16 via the communications link 12, 12a' via the fee-based destination communications link, a control period, e.g., eighteen seconds, must elapse before the predetermined fee is assessed to the monitored individual. If the CMS 16 determines that the non-fee-based communications mode is to be effectuated, the CMS 16 will terminate the access before the end of the control period so as to prevent the assessment of the predetermined fee. After such termination, the FMD 10 will re-access the CMS 16 via the non-fee-based destination communications link. The CMS may make its determination as to whether the fee-based or non-fee-based communications mode is to be effectuated in a manner similar to that used by the FMD 10 to make its determination. See FIG. 2.

Typically, the detection signals stored in the internal memory of the FMD 10 are logged as a function of time. The detection signals that have been recorded in the, FMD 10 since the last access of the communications network 14, are communicated to the CMS 16, once access is established through the appropriate communications link. Such detection signals may be cleared from the FMD's internal memory once sent to the CMS. In response to receiving the recorded detection signals, the CMS 16 prepares reports, or otherwise alerts the agency responsible for maintaining the CMS 16, as is known in the art of EHAM systems.

In an alternative embodiment of the invention the determination as to whether the fee-based, or non-fee-based communications mode is to be effectuated is again made in the FMD 10. See FIG. 3. However, only one destination communications link 12c' is utilized, a fee-selectable destination communications link 12c'. In this alternative embodiment, the FMD 10 periodically accesses the communications network, indicating that the fee-selectable destination communications link 12c' is to be utilized by communicating the destination control signal to the switching means. Such fee-selectable communications links 12c' are known in the art, and are provided, e.g., by Schers of Ohio, or BFD Productions under the name "Vari-A-Bill 1-900 Service." However, before coupling the fee-selectable communications link 12c' to the originating communications link 12, the switching means queries the FMD 10, e.g., with a query tone, as to whether the fee-based communications mode or the non-fee-based communications mode is to be effectuated. The FMD 10 responds to the query with a selection signal in response to which the switching means selects either the fee-based communications mode or the non-fee-based communications mode. The predetermined fee is assessed by the provider of the communications link only when the fee-based communications mode is selected during the accessing of the communications network 14. Thus, the fee-based communications mode and the non-fee based communications mode are effectuated in response to the selection signal. The selection signal assumes a first condition, e.g., a first tone, in order to Select the fee-based communications mode and assumes a second condition, e.g., a second tone, in order to select the non-fee-based communications mode.

Figure 3:
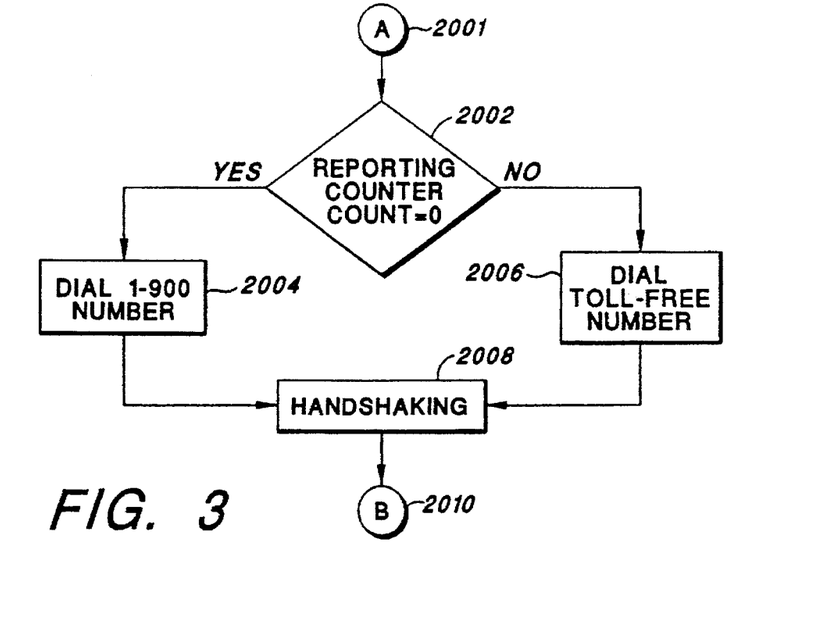
FIG. 3 is a flow chart that details the steps used in FIG. 2 in accordance with one embodiment of the present invention for accessing the communications network utilizing more than one communications link.

One alternative to using the FMD-generated selection signal is to utilize a selection signal communicated from the CMS 16. In the event that a CMS-generated selection signal is utilized, the switching means will complete the coupling of the FMD 10 to the CMS 16, before generating the query. The CMS 16 will respond to the query in a manner similar to that in which the FMD 10 responds, i.e., with the selection signal.

Note that the above description is directed to an EHAM system wherein a single FMD 10 accesses the CMS 16 via the communications network 14. In operation however, there may be plural FMD's e.g., 10, 24, 26 that access the CMS 16. Each of the FMD's 10, 24, 26 has at least one electronic detection circuit 18, 28, 30. Further, if the FMD's are part of an active monitoring system, each includes an RF link 20, 32, 34 and a receiving antenna 22, 36, 38 associated therewith that operates in a manner similar to that described above. Each of the FMD's 10, 24, 26 also has an originating communications link 12, 40, 42 through which it accesses the communications network 14. The switching means within the communications network 14 is capable of coupling each of the originating communications links 12, 40, 42 to an appropriate destination communications link 12' as described above. Because the predetermined fee, which is assessed whenever the fee-based communications link 12a' or the fee-selectable communications link 12c' (in the fee-based communications mode) is utilized, is assessed to a single monitored individual associated with the fee-based or fee-selectable communications link 12a', 12c', and because each of the FMD's 10, 24, 26 is associated with a different monitored individual, the fee-based communications link 12a' and the fee-selectable communications link 12c' may be utilized by only one of the FMD's 10 at any given time. Additional fee-based or fee-selectable communications links (not shown) may be utilized by the other FMD's 24, 26. In this way, each monitored individual is charged only those predetermined fees that are assessed in response to the monitored individual's FMD 10, 24, 26 accessing the communications network 14.

Alternatively, "caller information" may be transmitted to the communications network 14 during each access of the communications network 14. The "caller information" uniquely identifies the particular FMD 10, 24 or 26 that is accessing the communications network. The provider of the communications network 14 then utilizes the "caller information" in determining the appropriate monitored individual to which the predetermined fee should be assessed. In this way the fee-based and fee-selectable communications links 12a', 12c' may be utilized to couple each of the FMD's 10, 24 or 26 to the CMS 16, while the predetermined fee is assessed to each of the monitored individuals when their FMD 10, 24 or 26 is accessing the fee-based communications link 12a' or fee-selectable communications link 12c' (in the fee-based communications mode).

Advantageously, in one embodiment of the invention, the electronic detection circuit 18 and FMD 10 may be the same as are used in currently existing EHAM systems, i.e., the electronic detection circuit 18 and FMD 10 may be constructed and operate in the manner described in the above-cited patents, or as is otherwise known in the art. For such embodiment, the main difference between an FMD of the prior art, and an FMD used with the present invention, is the manner in which the FMD is programmed; or is otherwise configured to select a fee-based communications network. Such programming or configuring is detailed in the flow charts FIGS. 2–5. In other embodiments if the invention, a customized FMD and/or electronic detection circuit may be designed and fabricated in accordance with the principals set forth herein.

Figure 2:
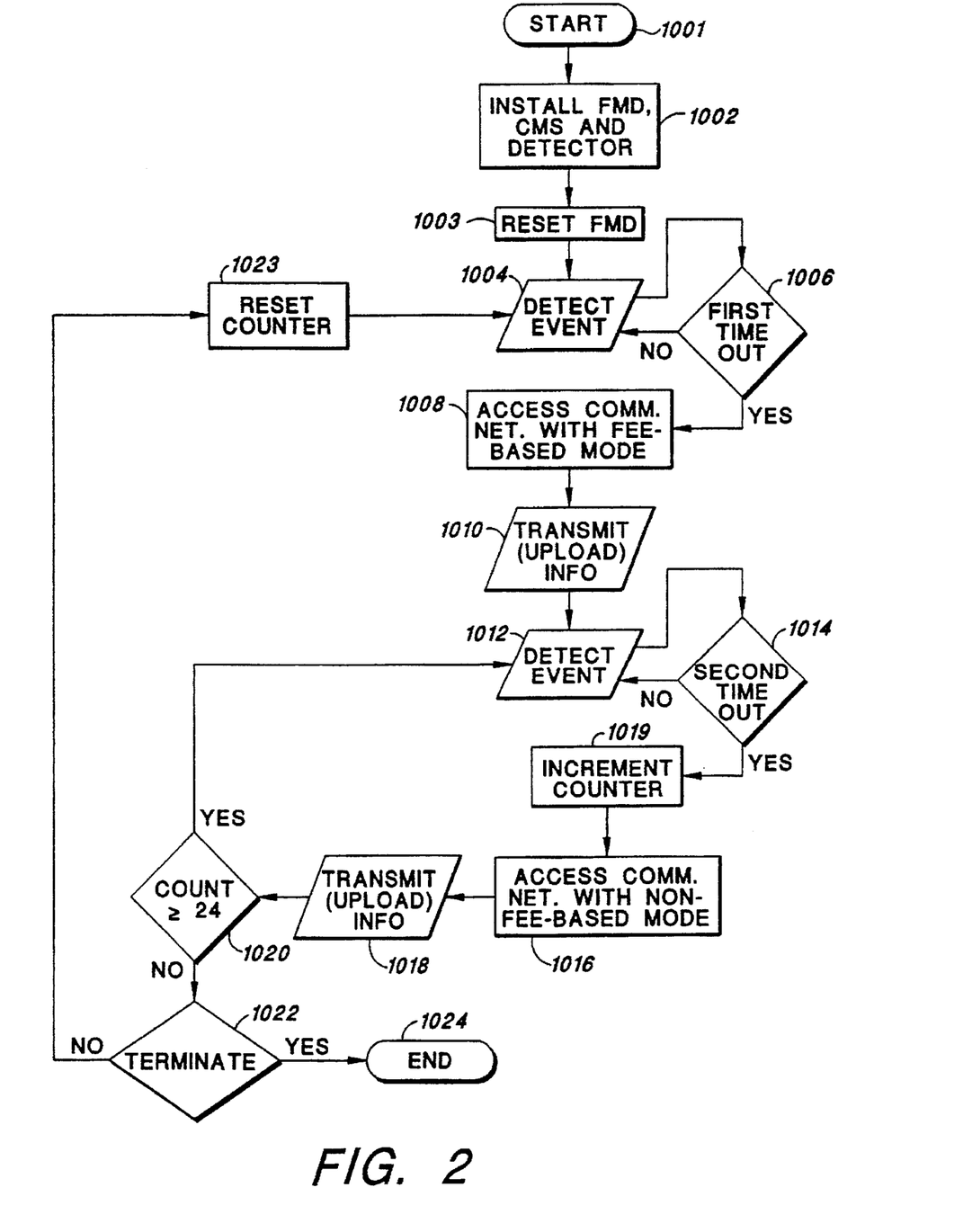
FIG. 2 is a flow chart that illustrates the basic operation of the EHAM system of FIG. 1 in accordance with the present invention so as to collect a prescribed fee from those being monitored by such EHAM system.

Referring next to FIG. 2, a flow chart is shown that illustrates the basic operation of the EHAM system of FIG. 1 in accordance with the invention. In this flow chart, and the other flow charts referenced herein, each main step of the operation is represented by a separate "block" (which may be a rectangle, a diamond, a circle, etc.) in the flow chart, with a brief description of the step appearing inside of or adjacent the block. For reference purposes, each block has a reference number assigned thereto, and such block reference numbers are generally referred to in parenthesis in the description that follows. Operation of the invention begins (at block 1000 of FIG. 2) with the installation of the FMD 10 at the monitoring location, the CMS 16 at a central location, and the electronic monitoring device 18 to the monitored individual (block 1002). The FMD 10 is reset to initial starting condition (block 1003), which includes resetting a reporting counter to zero. Operation of the FMD 10 then begins. Such operation includes detecting or not detecting the predetermined event in accordance with whether or not the detection signal is generated by the electronic detection circuit 18 (block 1004), and continuing to detect or not detect the predetermined event for a first predetermined period of time, e.g., one hour (blocks 1004 and 1006). After the first predetermined period has expired, the FMD 10 accesses the communications network 14 (blocks 1006 and 1008) using the fee-based communications mode described above. The FMD 10 then communicates to the CMS 16 through the accessed network 14 in order to upload whatever detection signals have been stored or generated during the preceding first predetermined time period (block 1010). Finally, the accessing of the communications network is terminated.

The FMD 10 continues to detect whether or not the detection signal has been generated (block 1012). The detecting continues for a second predetermined time period (blocks 1012 and 1014). Next, the reporting counter is incremented (block 1019) and the FMD 10 again accesses the communications link 14 (block 1016). The second predetermined time period may be the same as the first predetermined time period, e.g., one hour. However, such accessing (e.g., the second time that the CMS is accessed) is achieved using the non-fee-based communications mode. The FMD 10 then communicates to the CMS 16 so as to upload whatever detection signals were generated during the preceding second predetermined time period (block 1018). The accessing of the communications network 14 then terminates. If the count held in the reporting counter is less than a predetermined number e.g., twenty four (block 1020), then the FMD 10 again detects whether or not the detection signal is generated for the second predetermined time period (block 1012), and this process continues (blocks 1012, 1014, 1016, 1018, 1019 and 1020) until the count reaches the predetermined number. After the count reaches the predetermined number (block 1020), the counter is reset (block 1023) and the FMD 10 again detects whether or not the detection signal has been generated during the first predetermined period of time (blocks 1004 & 1006) and so forth (blocks 1008 and 1010). Operation of the invention continues in this manner, i.e., accessing the communications network 14 using the fee-based communications mode only once during the number of accesses defined by the predetermined number e.g., once every twenty-four accesses, and using the non-fee based communications mode during each of the other accesses, until termination of the FMD operation is desired (blocks 1022 and 1024).

It should be emphasized that the structure of the operation shown in FIG. 2—based on counting the number of accesses originated by the FMD, and assessing a fee only once during a predetermined number of such accesses—is illustrative of only one type of operation that may be used with the invention. Other schemes may also be used to achieve the same result. For example, the FMD may simply have a "fee flag" that is set once during each reporting period, e.g., once a day, by a clock signal. Such clock signal could originate either within the FMD or the CMS. Then, whenever contact is needed between the FMD and the CMS, whether such contact results from a scheduled contact or an unscheduled contact (e.g., a tamper event), such contact is made via the fee-based communication link only if the "fee flag" is set. As soon as one contact is made through the fee-based communications link, the "fee flag" is automatically reset and remains reset until set again by the clock signal at the beginning of the next reporting period. Thus, in this manner, the fee is automatically assessed only once during the reporting period (i.e., the fee-based communication link is used for just the first contact during the reporting period), and the fee is not assessed again until the next reporting period (i.e., the non-fee-based communication link(s) is used for all other contacts, regardless of how many these may be, during the reporting period.)

Referring next to FIG. 3, a flow chart is shown that details the steps used in FIG. 2, in accordance with one embodiment of the present invention, for accessing the communications network 14 utilizing more than one communications link. The accessing step (blocks 1008 or 1016) of FIG. 2 begins at the expiration of the first time period (block 1006 FIG. 3) or the second time period (block 1014 FIG. 2) (block 1001 FIG. 4). If the count is set to zero, as it will be after the first predetermined time period (block 1008 FIG. 3) (block 2002 FIG. 4), then the fee-based communications mode is initiated by accessing, or dialing, the fee-based destination communications link 12a' via the originating communications link 12 (block 2004). Such dialing accomplished through the use of a "1-900" number wherein the predetermined fee is assessed whenever the fee-based destination communications link 12a' is accessed. After the accessing of the fee-based destination communications link 12a', "handshaking" operations are commenced between the FMD 10 and the CMS 16 (block 2008), and operation continues (block 2010) with the transmission (or uploading) of information from the FMD 10 to the CMS 16 (block 1010 FIG. 3), as described above.

In the event that the count held in the reporting counter is not zero, i.e., if the count is greater than or equal to one (block 1002), the non-fee-based communications mode is initiated by accessing, or dialing, the non-fee-based communications link 12b' via the originating communications link 12 (block 2006). Such dialing is accomplished through the use of either a local number or "1-800" number wherein the predetermined fee is not assessed whenever the non-fee-based communications link 12b' is accessed. After accessing of the non-fee-based destination communications link 12b', the "handshaking" operations are commenced by the FMD 10 and the CMS 16 (block 2008), and operation continues (block 2010) with the transmission of information from the FMD 10 to the CMS 16 (block 1010 FIG. 3) as described above.

Note that while operation of the EHAM system is described above using a single FMD 10 that accesses the CMS 16, it is to be understood that in actual operation plural FMD's, e.g., the FMD's 10, 24 or 26 of FIG. 1, may access the CMS 16. Where plural FMD's are used, the identity of each FMD 10, 24 or 26 is communicated to the CMS 16 during the "handshaking" step (block 2008), and several separate fee-based communications links 12a' may be utilized. In this manner, the predetermined fee is automatically assessed to the monitored individual who's FMD 10, 24 or 26 accesses the CMS 16 in accordance with the above procedure.

As mentioned above, an alternative to having separate fee-based communications links for plural FMD's may be utilized where fee charging services are provided by the communications network 14 provider. That is, the predetermined fee can be assessed to the monitored individuals in accordance with a unique identity of each of the respective plural FMD's, e.g., the FMD's 10, 24, 26 of FIG. 1. Specifically, "caller information" that uniquely identifies the particular FMD 10, 24 or 26 that is accessing the communications network 14 is transmitted to the communications network 14, e.g., after the fee-based communications link is accessed (block 2004), but before the "handshaking" operations between the FMD 10, 24 or 26 and the CMS 16 (block 2008) have begun. Using the unique "caller information," the communications network 14 makes a determination as to which of the plural FMD's 10, 24 or 26 is accessing the communications network 14, and automatically assesses the predetermined fee to the appropriate monitored individual.

Because no predetermined fee is assessed when the non-fee-based mode is effectuated, a single non-fee-based communications link 12b' may be used by FMD's 10, 24, 26 to effectuate the non-fee-based communications mode under either of the above-mentioned alternatives.

Figure 4:
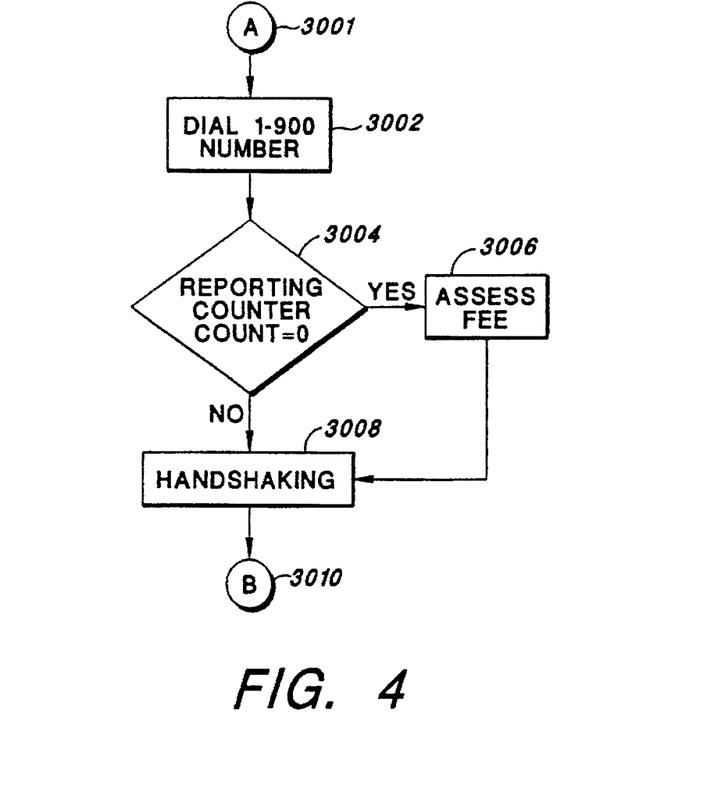
FIG. 4 is a flow chart that details the steps used in FIG. 2 for accessing the communications network in accordance with another embodiment of the present invention utilizing a single communications link.

Referring next to FIG. 4, a flow chart is shown that details the steps used in FIG. 2 for accessing the communications network in accordance with another embodiment of the present invention that utilizes a single communications link. The accessing step (blocks 1008 and 1016) of FIG. 2 begins after the first time period (block 1006 FIG. 2) or the second time period (block 1014 FIG. 3) (block 1001 FIG. 4). In the event that the count held in the reporting counter is set to zero, the fee-based communications mode is initialized by accessing the fee-selectable destination communications link 12c' (blocks 3002 and 3004). The predetermined fee is assessed (block 3006) whenever a selection signal, generated within the FMD, assumes a first condition. The selection signal is communicated from the FMD 10 to the switching means. Finally, the "handshaking" operations are engaged in by the FMD 10 and the CMS 16 (block 3008), and operation continues (block 3010) with the transmission of information from the FMD 10 to the CMS 16 (block 1010 FIG. 3) as described above.

In the event that the count held in the reporting counter is not set to zero, i.e., the count is greater than or equal to one, a non-fee-based communications mode is effectuated by accessing the fee-selectable communications link 12c' (block 3002 and 3004), and by generating and communicating a selection signal to the switching means from the FMD that assumes a second condition. Such second condition of the selection signal causes a non-fee-based communication to occur. Thereafter, the "handshaking" operations are engaged in by the FMD 10 and the CMS 16 (block 3008), and operation continues (block 3010) with the transmission (uploading) of information from the FMD 10 to the CMS 16 (block 1010 or 1018 FIG. 3) as described above.

Figure 5:
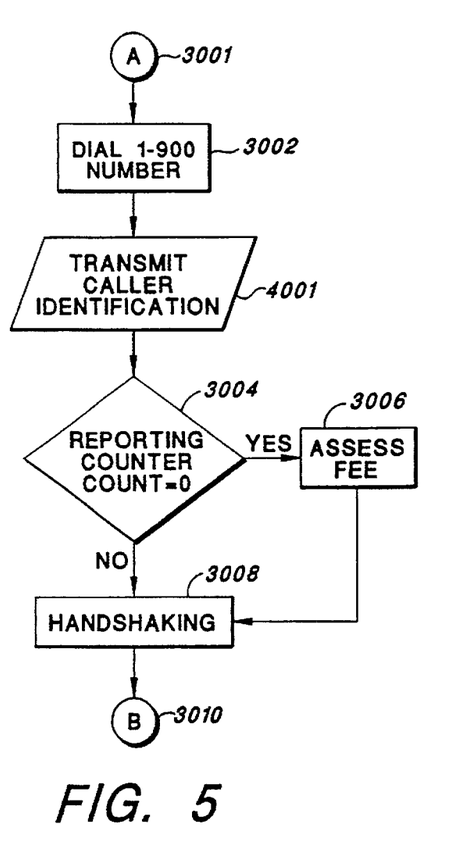
FIG. 5 is a flow chart that details the steps used in FIG. 2 for accessing the communications network utilizing a single communications network, as in FIG. 4, but wherein a determination is made as to a unique identity of the FMD that is accessing the communications network.

One limitation to the accessing steps described in FIG. 4 is that only one FMD 10 can be used to access the CMS 16 via the fee-selectable destination communications link (or via each of several fee-selectable communications links if plural FMD's are used with the CMS 16) at any given time. This is because whenever the fee-selectable communications link is accessed the predetermined fee is assessed to a specific monitored individual, depending not on the particular FMD 10, 24 or 26 that is utilized to access the communications link, but on the particular fee-selectable communications link through which the CMS 16 is accessed. This limitation can be overcome, however, by using "caller information" that uniquely identifies the particular FMD that is accessing the fee-selectable communications link. That is, such caller information may be transmitted (block 4001), as shown in FIG. 5, after the fee-selectable communications link has been accessed (block 3002), but before a determination has been made as to what count is set in the reporting counter (block 3004). Based on the "caller information," the communications network 14 determines the identity of the particular FMD 10, 24, or 26 that is accessing the communications link 14. The provider of the communications network 14 then assesses the predetermined fee to the monitored individual in accordance with the particular FMD identified by the "caller information."

Figure 6:
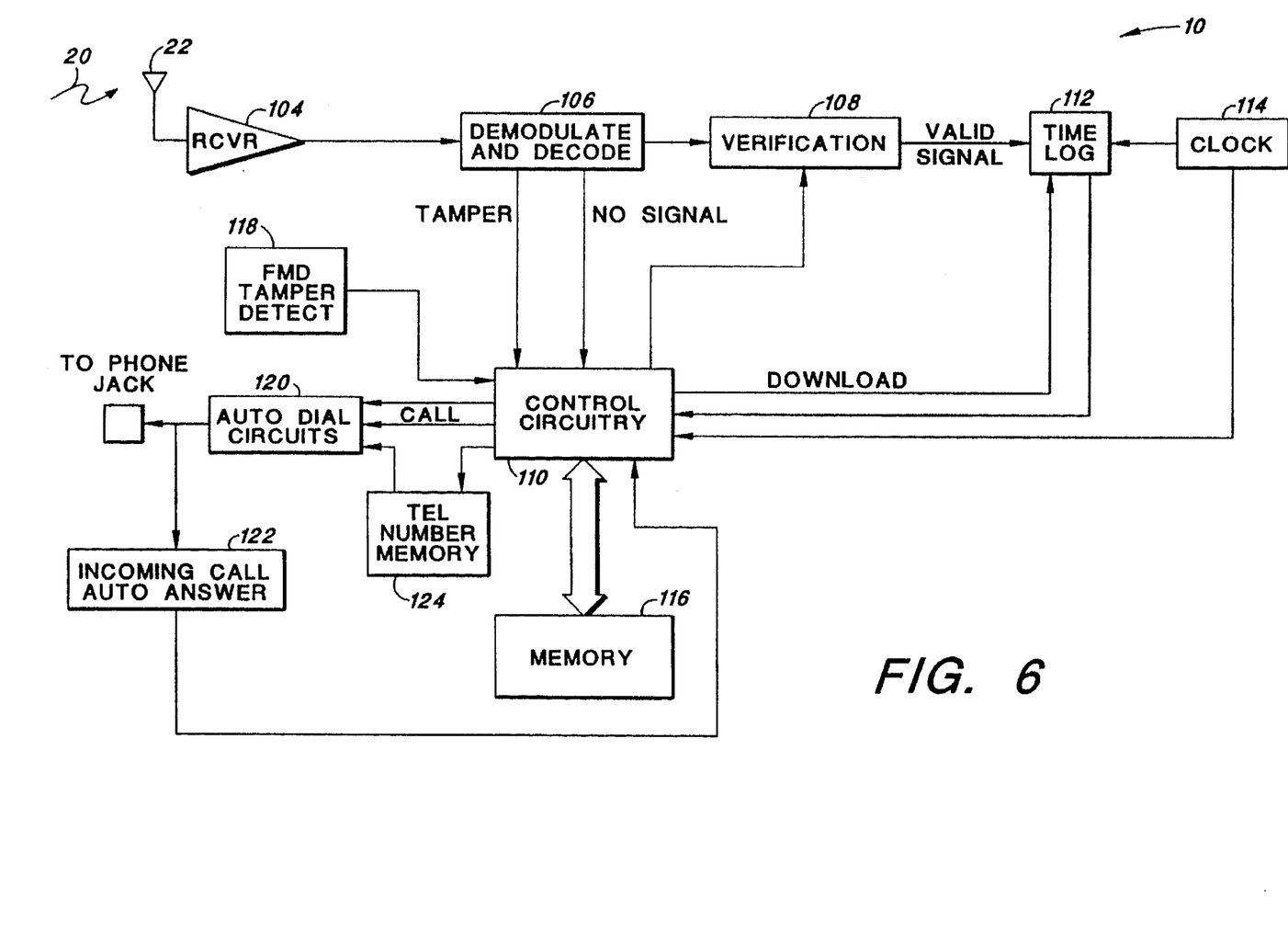
FIG. 6 is a functional block diagram representative FMD used within an EHAM System as shown in FIG. 1.

Turning next to FIG. 6, a block diagram is shown of a typical FMD 10 used with the present invention. As the present invention is not the FMD, per se, but rather a system or method that includes an FMD, or equivalent type of field monitoring device, the description that follows is abbreviated. A more complete description of an FMD may be found, e.g., in the above-cited patents of Pauley et al., incorporated herein by reference.

As seen in FIG. 6, and as explained previously in connection with FIG. 1, the FMD 10 includes an antenna 22 for receiving an identification (ID) signal 20 from a transmitter 28, or equivalent detection device, worn or carried by the individual being monitored. The ID signal 20 is received by a receiver circuit 104 and presented to a demodulation and decoding circuit 106. The demodulation and decoding circuit 106 determines if the ID signal that is received indicates a "tamper" event has occurred, or whether "no signal" is received; and generates appropriate "tamper" or "no signal" signals for presentation to FMD control circuitry 110. A verification circuit 108, enabled and controlled by the control circuitry 110, further determines if the signal received through the receiver 104, after demodulation and decoding, represents a valid signal. If so, the occurrence of such valid signal, described and referred to above as a "detection signal" is logged in a time log memory 112. The time log memory 112 is simply conventional memory that stores valid signals that are received as a function of time, where the "time" signals are obtained from a suitable clock circuit 114. Thus, if the monitored individual is within range of the FMD, so that the ID signal 20 is received through the antenna 22, then a valid signal entry is made at periodic intervals, determined by the clock circuit 44, into the time log memory 112. Should the monitored individual leave the monitored area, e.g., move out-of-range of the FMD receiving circuits so that the ID signal 20 is not received, then no valid signal is time logged into the time log memory 112. Hence, by downloading the information stored in the time log memory 112, a determination can be made as to when the monitored individual was present at the FMD location and when the monitored individual was absent from the FMD location.

The control circuitry 110, which is typically realized using a suitable microprocessor, generates whatever control signals are needed to download the information from the time log memory 112. Conventional memory circuitry 116, e.g., random access memory (RAM) and/or read-only memory (ROM), is coupled to the control circuitry 110 in a conventional manner. Such memory 116 includes, inter alia, the program code needed to carry out the processes described above in connection with the flow charts of FIGS. 2-5, or equivalent processes.

As further seen in FIG. 6, the FMD 10 also includes an FMD tamper circuit 118. Such circuit is normally passive, unless some attempt is made to tamper with the FMD, in which case it becomes active and alerts the control circuitry 110 of such tamper event. Normally, a tamper event, whether detected through the FMD tamper detect circuit 118, or whether detected through the ID signal 20, causes the control circuitry 110 to immediately telephone the CMS to report such tamper. Such telephoning is accomplished through automatic dialing circuitry 120. As explained above, such dialing may be, e.g., via a "1-900" telephone number, in which case a fee will be charged for such call; or via a local or "1-800" number, in which case no fee is charged. The telephone number that is dialed is selected from one of a plurality of telephone numbers that are stored in a telephone number memory 124 as controlled, in one embodiment of the invention, by the control circuitry 110. As explained above in connection with the flow charts of FIGS. 2-5, the telephone number selected is selected as a function of how many times the CMS 16 has been contacted during a given reporting period, e.g., 24 hours. Such control allows an appropriate fee to be charged only once during a given reporting period.

In some instances, the CMS 16 may contact the FMD 10. Such contact may also be made through the telephone line (or other equivalent communication link) using an incoming telephone automatic answering circuit 122. Such circuits are known in the art, and are frequently used in computers, fax machines, answering machines, and the like.

Thus, as seen in FIG. 6, the FMD 10 allows for the automatic monitoring of the individual as a function of whether a tamper event is detected and/or as a function of the time-logging of a valid ID signal. At periodic intervals, or as polled by the CMS 16, a communications link is established between the FMD 10 and the CMS 16 to report the events detected at the FMD 10. Such communications link is typically achieved via a conventional telephone line, but numerous other communications links may also be used. Regardless of how many times during a given reporting period such communications link is established, the present invention assures that only one fee (i.e., the predetermined fee) is charged to the monitored individual during each reporting period, e.g., once each day.

As described above, it is thus seen that several embodiments of an EHAM system are provided wherein a predetermined fee is automatically assessed to an individual being monitored by the provider of the communications network in response to the network being accessed in the fee-based communications mode, whereby the agency responsible for the CMS 16 does not have to directly assess the predetermined fee to the monitored individual, but can rather get it from the provider of the communications network.

While the invention herein disclosed has been described by means of specific embodiments and applications thereof, numerous modifications and variations could be made thereto by those skilled in the art without departing from the scope of the invention set forth in the claims.

What is claimed is:

1. A method of operating an electronic house arrest monitoring (EHAM) system so as to automatically assess a prescribed fee to a responsible person or entity that has consented or been assigned responsibility to pay monitoring fees for an individual whose presence or absence at a monitoring location is being monitored by the electronic house arrest monitoring system, said method comprising the steps of:

(a) installing a field monitoring device at the monitoring location and coupling an electronic detection circuit to the individual to be monitored at the monitoring location;

(b) detecting whether a prescribed event occurs during a first predetermined period of time;

(c) generating a detection signal within the field monitoring device in the event the prescribed event is detected as occurring during the first predetermined period of time;

(d) accessing a communications network with the field monitoring device using a fee-based communications mode that has a prescribed fee associated therewith that is automatically assessed to the responsible person or entity when the communications network is accessed using the fee-based communications mode; and (e) transmitting information indicating whether the prescribed event was detected in step (b) from the field monitoring device to a central monitoring system through the communications network, whereby the central monitoring system receives information indicating whether the prescribed event occurred during the first predetermined period of time.

2. The method of claim 1, further including the steps of:

(f) detecting whether said prescribed event occurs during a second predetermined period of time;

(g) generating said detection signal within the field monitoring device in the event the prescribed event is detected as occurring during the second predetermined period of time;

(h) accessing said communications network with said field monitoring device using a non-fee-based communications mode that does not automatically assess the prescribed fee to the responsible person or entity when the communications network is accessed using the non-fee-based communications mode; and (i) transmitting information indicating whether the prescribed event was detected in step (f) from said field monitoring device to said central monitoring system through said communications network.

3. The method of claim 2, further including the steps of:

(j) repeating steps (f) through (i) a plurality of times; and (k) repeating steps (b) through (j) a plurality of times.

4. The method of claim 3 wherein said first and second predetermined periods of time in steps (b) and (f) are at least one-half-hour periods of time, and wherein said plurality of times in step (j) is at least three.

5. The method of claim 4 wherein said first and second predetermined periods of time in steps (b) and (f) are approximately one hour periods of time, and wherein said plurality of times in step (j) is approximately twenty-two; whereby the responsible person or entity is assessed the prescribed fee once every twenty-four hours.

6. The method of claim 2 wherein step (d) comprises accessing said communications network with said field monitoring device through a first communications link, and wherein step (h) comprises accessing said communications network with said field monitoring device through a second communications link.

7. The method of claim 6 wherein step (d) comprises accessing said communications network with said field monitoring device through a "1-900" telephone number such that said prescribed fee is automatically charged to said responsible person or entity whenever said "1-900" telephone number is accessed, and wherein step (h) comprises accessing said communications network with said field monitoring device through a toll-free telephone number such that said prescribed fee is not charged to said responsible person or entity whenever said toll-free number is accessed.

8. The method of claim 7 wherein step (d) comprises the steps of:

(d1) accessing said communications network with said field monitoring device through said "1-900" telephone number such that said prescribed fee is automatically charged to said responsible person or entity whenever said "1-900" telephone number is accessed; and (d2) transferring at least a portion of said prescribed fee to any agency that has assumed responsibility for said central monitoring system, whereby said agency is automatically paid for the agency's assumption of the responsibility for said central monitoring system.

9. The method of claim 6 wherein step (d) comprises accessing said communications network with said field monitoring device through said first communications link in a manner that uniquely identifies the field monitoring device that is accessing said communications network, and wherein step (h) comprises accessing said communications network with said field monitoring device through said second communications link in a manner that uniquely identifies the field monitoring device that is accessing said communications network.

10. The method of claim 6 further including the step of:

(d1) terminating the accessing of the communications network in step (d) before said automatic charging of the prescribed fee has occurred in the event that said accessing occurs after said communications network has been accessed utilizing said fee-based communications mode without at least one intervening access of said communications network utilizing said non-fee-based communications mode.

11. The method of claim 2 wherein step (d) and step (h) each include accessing a single communications link in a manner that uniquely identifies the field monitoring device that is accessing the single communications link, and determining whether said fee-based communications mode or said non-fee-based communications mode is to be effectuated based at least in part on the unique identity of the field monitoring device that is accessing the single communications link.

12. The method of claim 11 wherein the determining of whether said fee-based communications mode or said non-fee-based communications mode is to be effectuated is done at least in part in said central monitoring system.

13. The method of claim 11 wherein the determining of whether said fee-based communications mode or said non-fee-based communications mode is to be effectuated is done at least in part in said communications network.

14. The method of claim 11 wherein step (d) and step (h) each comprise:

accessing a "1-900" telephone number in a manner that uniquely identifies the field monitoring device that is accessing the single communications link;

determining whether said fee-based communications mode or said non-fee-based communications mode is to be effectuated based at least in part on the unique identity of the field monitoring device that is accessing the single communications link;

charging automatically said prescribed fee in response to determining that said fee-based communications mode is being effectuated, and not charging automatically the prescribed fee in response to determining that said non-fee-based communications mode is being effectuated.

15. A method of operating an electronic house arrest monitoring (EHAM) system that automatically charges a prescribed fee to individuals being monitored by said EHAM system, said method comprising:

(a) installing a field monitoring device (FMD) at each location where a monitored individual is expected to be, said field monitoring device including electronic detection circuitry and automatic telecommunications circuitry;

(b) detecting when said monitored individual is at said location using said electronic detection circuitry within said field monitoring device;

(c) sending automatically a report from said field monitoring device to a central monitoring location that communicates the detection made in step (b), said report being sent at least once during a prescribed reporting period;

(d) sending the report of step (c) through one of a plurality of communications links depending upon the number of reports that have been sent during the prescribed reporting period, one of said plurality of communications links comprising a fee-based communications link that imposes a prescribed fee that is billed to said monitored individual each time that said fee-based communications link is accessed by said field monitoring device, and another of said plurality of communications links comprising a communications link that does not impose a prescribed fee each time that it is accessed; and (e) sending the report of step (c) through the fee-based communications link only once during the prescribed reporting period, whereby the prescribed fee is charged to said monitored individual only once during the prescribed reporting period.

16. A method of operating an electronic monitoring (EM) system that automatically charges a prescribed fee for an individual being monitored by said EM system for a monitoring period during which the individual is monitored by said EM system, said method comprising the steps of:

(a) installing a field monitoring device (FMD) at a location where the individual being monitored is supposed to be at least some time during said monitoring period, said field monitoring device including detection circuitry that detects when said monitored individual is present at or absent from said location and automatic telephone dialing circuitry that selectively dials at least first and second telephone numbers; and coupling said automatic telephone dialing circuitry to a telephone network through a telephone line for which a responsible person or entity has assumed financial responsibility for the prescribed fee associated with the use of said EM system;

(b) detecting with the detection circuitry a time when said monitored individual is present at or absent from said location;

(c) using the automatic telephone dialing circuitry within said field monitoring device to dial the first telephone number and thereby connect said field monitoring device through the telephone network to a central processing unit (CPU) at a central monitoring location at least once during the monitoring period;

(d) electronically communicating information through said telephone link that includes said time when said monitored individual is present it or absent from said location;

(e) using the automatic telephone dialing circuitry within said field monitoring device to dial the second telephone number once during the monitoring period and thereby connect said field monitoring device to a fee-based telephone network that charges said predetermined fee to said telephone line for which said person or entity has assumed financial responsibility each time such connection is made.

17. The method of operating an EM system as set forth in claim 16 wherein said second telephone number comprises a prescribed "1-900" telephone number, said "1-900" telephone number automatically charging a prescribed fee to any party who accesses it.

18. The method of operating an EM system as set forth in claim 17 further including transferring a prescribed portion of any fees paid by the person or entity who has assumed financial responsibility for the telephone line coupled to said field monitoring device to a monitoring agency that operates and maintains said CPU at the central monitoring location, whereby said monitoring agency is automatically paid for the monitoring it performs through said CPU.

19. A method of operating an electronic monitoring (EM) system that automatically charges a fee to an assigned telephone line used in monitoring an individual by said EM system, said method comprising:

(a) installing a field monitoring device (FMD) at each location where said individual is expected to be, said field monitoring device having detection circuitry therein that detects when said monitored individual is present at or absent from said location, and automatic telephone dialing circuitry programmed to dial a prescribed telephone number that causes a connection of the FMD through a telephone network to a telephone receiver at a monitoring agency;

(b) coupling said field monitoring device to said telephone network through said assigned telephone line;

(c) detecting with the detection circuitry in said FMD a time when said monitored individual is present at or absent from said location;

(d) programming said FMD to automatically dial said prescribed telephone number using said automatic telephone dialing circuitry in said FMD during a prescribed reporting period and thereby initiating a telephone call to said telephone receiver at said monitoring agency;

(e) receiving the telephone call dialed in step (d) with said telephone receiver;

(f) coupling the telephone call received by the telephone receiver in step (e) to a central processing unit (CPU) maintained by the monitoring agency to establish a telephone link between said field monitoring device and said CPU;

(g) determining with said CPU if said telephone call originated from the assigned telephone line coupled to said field monitoring device, and if so, charging a first prescribed fee to the assigned telephone line for the first time an incoming telephone call is received from said assigned telephone line during each reporting period, and charging a second prescribed fee to the assigned telephone line the second and subsequent times that an incoming telephone call is received from said assigned telephone line during said reporting period; and (h) determining with said FMD information including the time when said monitored individual is present at or absent from said location and electronically communicating said information through said telephone link from said FMD to said CPU.

20. The method of operating an EM system as set forth in claim 19 wherein said first prescribed fee comprises a set amount that said monitored individual is to be charged for the monitoring function performed by said EM system during each reporting period, and said second prescribed fee is zero; whereby said set amount is charged to the telephone line once and only once during each reporting period.

21. The method of operating an EM system as set forth in claim 19 wherein said reporting period comprises a prescribed number of hours.

22. The method of operating an EM system as set forth in claim 21 wherein said prescribed number of hours is twenty-four.

23. An electronic house arrest monitoring (EHAM) system that monitors and detects the presence or non-presence of an individual that is being monitored at a monitoring location and automatically assesses a predetermined fee to a responsible person or entity that has agreed or been ordered to pay costs associated with monitoring the individual, said EHAM system including:

means for detecting the presence or non-presence of said individual at a monitoring location;

means for generating a detection signal in response to the detected presence or non-presence of the individual at the monitoring location;

means for accessing a communications network using a fee-based communications mode;

means for transmitting information through the communications network to a central monitoring system (CMS) at a monitoring location, said central monitoring system being operated by an agency; and means for an operator of the communications network to automatically assess the predetermined fee to said responsible person or entity in response to the accessing of the communications network using the fee-based communications mode.

24. The electronic house arrest monitoring system of claim 22, including means for accessing said communications network using a non-fee-based communications mode and means for determining when said communications network should be accessed in said fee-based communications mode and when said communications network should be accessed in said non-fee-based communications mode.

25. An electronic house arrest monitoring (EHAM) system that monitors the presence or non-presence of an individual being monitored at a monitoring location, said EHAM system including:

a central monitoring system (CMS);

a communications network coupled to the central monitoring system;

a field monitoring device (FMD) located at the monitoring location, said field monitoring device being connectable to the communications network for accessing the communications network in a fee-based communications mode in the event a fee-based communications mode is selected by the EHAM system; and an electronic detection circuit attached to the individual to be monitored at the monitoring location that communicates a detection signal indicative of the presence or non-presence of said individual at said monitoring location to the field monitoring device upon the occurrence of a predetermined event.

26. The electronic house arrest monitoring system of claim 25, wherein said field monitoring device is connectable to said communications network for accessing said communications network in a non-fee based communications mode in the event a non-fee based communications mode is selected by the EHAM system.

* * * * *